United States Patent
Chang et al.

(10) Patent No.: US 11,636,341 B2
(45) Date of Patent: Apr. 25, 2023

(54) PROCESSING SEQUENTIAL INTERACTION DATA

(71) Applicant: Advanced New Technologies Co., Ltd., Grand Cayman (KY)

(72) Inventors: Xiaofu Chang, Hangzhou (CN); Jianfeng Wen, Hangzhou (CN); Le Song, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 193 days.

(21) Appl. No.: 17/188,112

(22) Filed: Mar. 1, 2021

(65) Prior Publication Data

US 2021/0182680 A1 Jun. 17, 2021

Related U.S. Application Data

(63) Continuation of application No. 16/816,719, filed on Mar. 12, 2020, now Pat. No. 10,936,950, which is a
(Continued)

(30) Foreign Application Priority Data

Aug. 15, 2019 (CN) .......................... 201910755561.5

(51) Int. Cl.
*G06N 3/08* (2006.01)
*G06F 16/21* (2019.01)
*G06N 3/04* (2006.01)

(52) U.S. Cl.
CPC .............. *G06N 3/08* (2013.01); *G06F 16/212* (2019.01); *G06N 3/04* (2013.01)

(58) Field of Classification Search
CPC ........... G06N 3/08; G06N 3/04; G06F 16/212
See application file for complete search history.

(56) References Cited

U.S. PATENT DOCUMENTS

| 2004/0141646 A1 | 7/2004 | Mahmoud Fahmy et al. |
| 2019/0080260 A1 | 3/2019 | Acuna Agost et al. |
| 2019/0130273 A1* | 5/2019 | Keskar ................ G06N 3/0454 |

FOREIGN PATENT DOCUMENTS

| CN | 102244587 | 11/2011 |
| CN | 105426365 | 3/2016 |

(Continued)

OTHER PUBLICATIONS

Wang, Yau-Shian, Hung-Yi Lee, and Yun-Nung Chen. "Tree transformer: Integrating tree structures into self-attention." arXiv preprint arXiv: 1909.06639 (2019). (Year: 2019).*

(Continued)

*Primary Examiner* — Kevin W Figueroa
(74) *Attorney, Agent, or Firm* — Fish & Richardson P.C.

(57) ABSTRACT

This disclosure relates to processing sequential interaction data through machine learning. In one aspect, a method includes obtaining a dynamic interaction graph constructed based on a dynamic interaction sequence. The dynamic interaction sequence includes interaction feature groups corresponding to interaction events. Each interaction feature group includes a first object, a second object, and an interaction time of an interaction event that involved the first object and the second object. The dynamic interaction graph includes multiple nodes including, for each interaction feature group, a first node that represents the first object of the interaction feature group and a second node that represents the second object of the interaction feature group. A current sequence corresponding to a current node to be analyzed is determined. The current sequence is input into a Transformer-based neural network model. The neural network model determines a feature vector corresponding to the current node.

19 Claims, 10 Drawing Sheets

Related U.S. Application Data continuation of application No. PCT/CN2020/072042, filed on Jan. 14, 2020.

(56) References Cited

FOREIGN PATENT DOCUMENTS

| CN | 109299373 | 2/2019 |
|---|---|---|
| CN | 109359140 | 2/2019 |
| CN | 109522474 | 3/2019 |
| CN | 109582147 | 4/2019 |
| CN | 109816101 | 5/2019 |
| CN | 109993346 | 7/2019 |
| CN | 110009093 | 7/2019 |
| CN | 110060097 | 7/2019 |
| CN | 110543935 | 12/2019 |
| CN | 110555469 | 12/2019 |
| CN | 110569437 | 12/2019 |
| CN | 110598847 | 12/2019 |

OTHER PUBLICATIONS

Wang, Chao, et al. "Incorporating non-sequential behavior into click models." Proceedings of the 38th International ACM SIGIR Conference on Research and Development in Information Retrieval. 2015. (Year: 2015).*

Crosby et al., "BlockChain Technology: Beyond Bitcoin," Sutardja Center for Entrepreneurship & Technology Technical Report, Oct. 16, 2015, 35 pages.

Harer et al. "Tree-transformer: A Transformer-Based Method for Correction of Tree-Strucutre Data," arXiv: 1908.00449, Aug. 2019, 13 pags.

Nakamoto, "Bitcoin: A Peer-to-Peer Electronic Cash System," www.bitcoin.org, 2005, 9 pages.

PCT International Search Report and Written Opinion in International Application No. PCT/CN2020/072042, dated May 20, 2020, 20 pages (with machine translation).

Wang et al., "Incorporating Non-Sequential Behavior Into Click Models," SIGIR '15: Proceedings of the 38th International ACM SIGIR Conference on Research and Development in Indormation Retrieval, Aug. 2015, pp. 283-292.

PCT International Preliminary Report on Patentability in International Application No. PCT/CN2020/072042, dated Feb. 8, 2022, 11 pages (with English translation).

\* cited by examiner

PROCESSING SEQUENTIAL INTERACTION DATA

CROSS-REFERENCE TO RELATED APPLICATIONS

This application is a continuation of U.S. application Ser. No. 16/816,719, filed Mar. 12, 2020, which is a continuation of PCT Application No. PCT/CN2020/072042, filed on Jan. 14, 2020, which claims priority to Chinese Patent Application No. 201910755561.5, filed on Aug. 15, 2019, and each application is hereby incorporated by reference in its entirety.

TECHNICAL FIELD

One or more implementations of the present specification relate to the field of machine learning, and in particular, to processing sequential interaction data through machine learning.

BACKGROUND

In many scenarios, user interaction events need to be analyzed and processed. An interaction event is one of basic constituent elements of an Internet event. For example, a click behavior performed by a user when browsing a page can be regarded as an interaction event between the user and a content block of the page, a purchase behavior in e-commerce can be regarded as an interaction event between a user and a product, and an inter-account transfer behavior is an interaction event between users. A series of interaction events of a user reflect features of the user such as habit/preference and features of interaction objects, which are an important source of features of a machine learning model. Therefore, in many scenarios, interaction participants need to be expressed and modeled based on interaction events.

However, interaction events involve both interaction parties, and the status of each party can be dynamically changed. Therefore, it is very difficult to comprehensively consider a plurality of features of the interaction parties to accurately express their features. Therefore, an improved solution is needed to analyze the interaction objects more effectively to obtain feature vectors suitable for subsequent analysis.

SUMMARY

One or more implementations of the present specification describe methods and devices for processing sequential interaction data, in which interaction objects involved in interaction events and influence of other objects involved in the interaction events are considered by using a neural network model, and the interaction objects are processed as feature vectors, thereby facilitating subsequent analysis.

According to a first aspect, a method for processing sequential interaction data is provided, including: obtaining a dynamic interaction graph constructed based on a dynamic interaction sequence, where the dynamic interaction sequence includes a plurality of interaction feature groups corresponding to a plurality of interaction events arranged in chronological order, and each interaction feature group includes a first object, a second object, and interaction times of an interaction; and the dynamic interaction graph includes a plurality of nodes that represent each first object and each second object in each interaction feature group, the plurality of nodes include a first node, the first node points to two leaf nodes by edges, and the two leaf nodes respectively represent two objects in an interaction feature group corresponding to the last interaction event in which the interaction object corresponding to the first node participates; determining, in the dynamic interaction graph, a current sequence corresponding to a current node to be analyzed, where the current sequence includes a plurality of nodes within a predetermined range reachable from the current node through edges and positional encoding of each of the plurality of nodes relative to the current node in the dynamic interaction graph;

inputting the current sequence into a Transformer-based neural network model, where the neural network model includes an embedding layer and at least one attention layer; obtaining, at the embedding layer, N embedded vectors based on node features and the positional encoding of each node in the current sequence; combining, at each attention layer, input vectors based on the degree of correlation between the N input vectors obtained from the preceding layer to obtain N output vectors; and determining, by the neural network model, the feature vector corresponding to the current node based on the N output vectors obtained by the at least one attention layer.

In an implementation, a dynamic interaction graph is obtained as follows: obtaining an existing dynamic interaction graph constructed based on an existing interaction sequence; obtaining a new interaction feature group corresponding to a new interaction event; adding the first object and the second object included in the new interaction feature group to the existing dynamic interaction graph as two new nodes; and for each new node that has a leaf node, adding edges from the new node to its two leaf nodes.

In another implementation, a dynamic interaction graph is obtained as follows: obtaining an existing dynamic interaction graph constructed based on an existing interaction sequence; obtaining a new interaction sequence, where the new interaction sequence includes a plurality of new interaction feature groups corresponding to a plurality of new interaction events; for each new interaction feature group, adding the first object and the second object to an existing dynamic interaction graph as two new nodes; and for each new node that has a leaf node, adding edges from the new node to its two leaf nodes.

In an implementation, the current node is a node that has no edge in the dynamic interaction graph.

According to an implementation, the nodes within the predetermined range include any node within a predetermined quantity K of edges; and/or any node whose interaction time is within a predetermined range.

In an implementation, the first object and the second object are respectively an object of a first classification and an object of a second classification, the two leaf nodes include a left node and a right node, the left node corresponds to an object of a first classification in the last interaction event, and the right node corresponds to an object of a second classification in the last interaction event.

In this case, the positional encoding includes the quantity of edges that each node passes relative to the current node, and whether the node is the left node or the right node.

According to an implementation, each interaction feature group further includes a behavior feature of an interaction; and thus the node features and the positional encoding of each node in the current sequence can include attribute features of an interaction object corresponding to the node and behavior features of an interaction feature group in which the node is located.

In an implementation, the embedding layer obtains N embedded vectors as follows: embedding the node features of each node to obtain N node embedded vectors; embedding the positional encoding of each node to obtain N position embedded vectors; and combining the N node embedded vectors and the N position embedded vectors to obtain the N embedded vectors.

In an implementation, the attention layer obtains N output vectors as follows: using a first transformation matrix Q, a second transformation matrix K, and a third transformation matrix V to transform each of the N input vectors to obtain a first intermediate vector, a second intermediate vector, and a third intermediate vector corresponding to each of the N input vectors; for any $i^{th}$ input vector in the N input vectors, determining the degree of correlation between the $i^{th}$ input vector and each input vector based on the dot product operation performed on the first intermediate vector corresponding to the $i^{th}$ input vector and each second intermediate vector corresponding to each input vector; performing weighted combination on the third intermediate vector corresponding to each input vector by using the degree of correlation between the $i^{th}$ input vector and each input vector as a weighting factor to obtain the $i^{th}$ combination vector corresponding to the $i^{th}$ input vector; and obtaining N output vectors based on each combination vector corresponding to each input vector.

Further, in an implementation, each attention layer maintains m sets of transformation matrices, and each set of transformation matrices includes the first transformation matrix Q, the second transformation matrix K, and the third transformation matrix V, so as to obtain m vector sequences, and each vector sequence includes N combination vectors obtained based on a set of transformation matrices; and the attention layer then concatenates the m vector sequences to obtain a concatenation matrix, and the concatenated matrix is transformed by using the fourth transformation matrix, and the matrix obtained through transformation is split into N vectors as the N output vectors.

In an implementation, the at least one attention layer refers to a plurality of attention layers including a first attention layer connected to the embedding layer and subsequent attention layers, the first attention layer obtains the N embedded vectors from the embedding layer as its N input vectors, and each subsequent attention layer obtains the N output vectors obtained by the preceding attention layer as its N input vectors.

Further, if there are a plurality of attention layers, the neural network model can combine N output vectors obtained by each of the plurality of attention layers to obtain a feature vector of the current node.

In another implementation, the neural network model can alternatively combine the N output vectors obtained by the last attention layer in the plurality of attention layers to obtain a feature vector of the current node.

According to an implementation, the neural network model is trained as follows: obtaining a historical feature groups corresponding to a historical interaction event, where the historical feature group includes a first sample object and a second sample object; determining, in the dynamic interaction graph, a first sequence corresponding to the first sample object and a second sequence corresponding to the second sample object; respectively inputting the first sequence and the second sequence into the neural network model to obtain a first feature vector corresponding to the first sample object and a second feature vector corresponding to the second sample object; predicting, based on the first feature vector and the second feature vector, whether the first sample object and the second sample object interact, to obtain a prediction result; determining a predicted loss based on the prediction result; and updating the neural network model based on the predicted loss.

According to another implementation, the neural network model is trained as follows: selecting a sample object from the dynamic interaction sequence, and obtaining a classification label of the sample object; determining, in the dynamic interaction graph, a sample sequence corresponding to the sample object; inputting the sample sequence into the neural network model to obtain a feature vector of the sample object; predicting a classification of the sample object based on the feature vector of the sample object to obtain a prediction result; determining a predicted loss based on the prediction result and the classification label; and updating the neural network model based on the predicted loss.

According to a second aspect, a device for processing sequential interaction data is provided, including: an interaction graph acquisition unit, configured to obtain a dynamic interaction graph constructed based on a dynamic interaction sequence, where the dynamic interaction sequence includes a plurality of interaction feature groups corresponding to a plurality of interaction events arranged in chronological order, and each interaction feature group includes a first object, a second object, and an interaction time of an interaction; and the dynamic interaction graph includes a plurality of nodes that represent each first object and each second object in each interaction feature group, the plurality of nodes include a first node, the first node points to two leaf nodes by edges, and the two leaf nodes respectively represent two objects in an interaction feature group corresponding to the last interaction event in which the interaction object corresponding to the first node participates; a sequence determining unit, configured to determine, in the dynamic interaction graph, a current sequence corresponding to a current node to be analyzed, where the current sequence includes a plurality of nodes within a predetermined range reachable from the current node through edges and positional encoding of each of the plurality of nodes relative to the current node in the dynamic interaction graph; and a sequence processing unit, configured to input the current sequence into a Transformer-based neural network model, where the neural network model includes an embedding layer and at least one attention layer; obtain, at the embedding layer, N embedded vectors based on node features and the positional encoding of each node in the current sequence; combine, at each attention layer, input vectors based on the degree of correlation between the N input vectors obtained from the preceding layer to obtain N output vectors; and determine, by the neural network model, the feature vector corresponding to the current node based on the N output vectors obtained by the at least one attention layer.

According to a third aspect, a computer readable storage medium is provided, where the medium stores a computer program, and when the computer program is executed on a computer, the computer is enabled to perform the method according to the first aspect.

According to a fourth aspect, a computing device is provided, including a memory and a processor, where the memory stores executable code, and when the processor executes the executable code, the method of the first aspect is implemented.

According to the method and device provided in the implementations of the present specification, a dynamic interaction graph is constructed based on the dynamic interaction sequence, where the dynamic interaction graph reflects a time sequence relationship between the interaction events, and mutual influence transferred between the interaction objects through interaction events. Feature vectors of an interaction object can be extracted based on sequence information that is related to the interaction object in the dynamic interaction graph and a pre-trained Transformer-based neural network model. As such, the influence of other interaction objects in each interaction event is introduced into the feature vector, so that deep features of the interaction object can be comprehensively expressed.

BRIEF DESCRIPTION OF DRAWINGS

To describe the technical solutions in the implementations of the present specification more clearly, the following briefly introduces the accompanying drawings required for describing the implementations. Clearly, the accompanying drawings in the following description are merely some implementations of the present specification, and a person of ordinary skill in the field can still derive other drawings from these accompanying drawings without creative efforts.

DESCRIPTION OF IMPLEMENTATIONS

The solutions provided in the present specification are described below with reference to the accompanying drawings.

As described above, interaction participants (that is, interaction objects) need to be expressed and modeled based on interaction events.

In one solution, a static interaction relationship network graph is constructed based on historical interaction events, so that interaction objects can be analyzed based on the interaction relationship network graph. Specifically, the interaction network graph can be formed by using the participants of each historical event as nodes and establishing edges between the nodes with an interaction relationship.

Figure 1A:
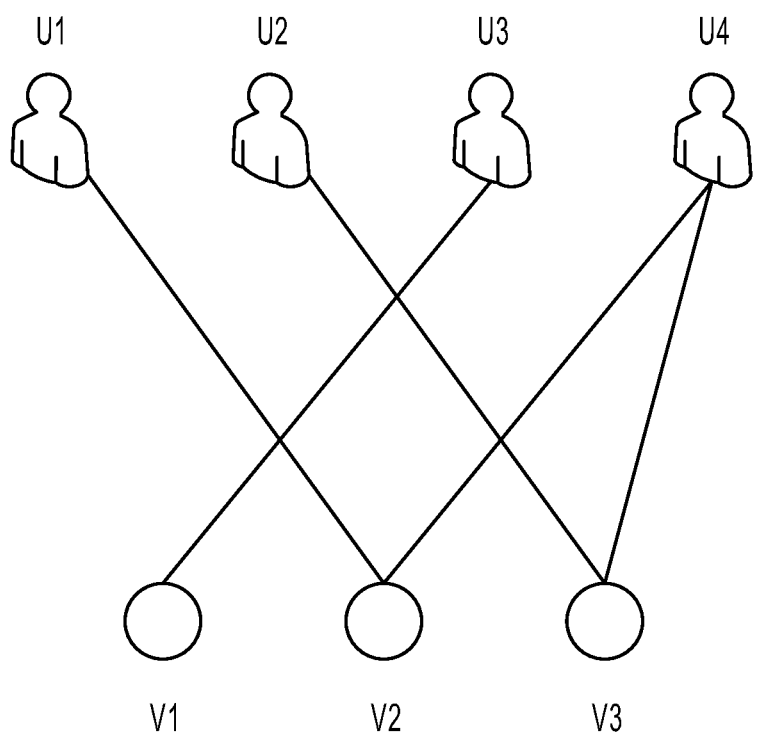
FIG. 1A is a relationship bipartite graph in an example.
Figure 1B:
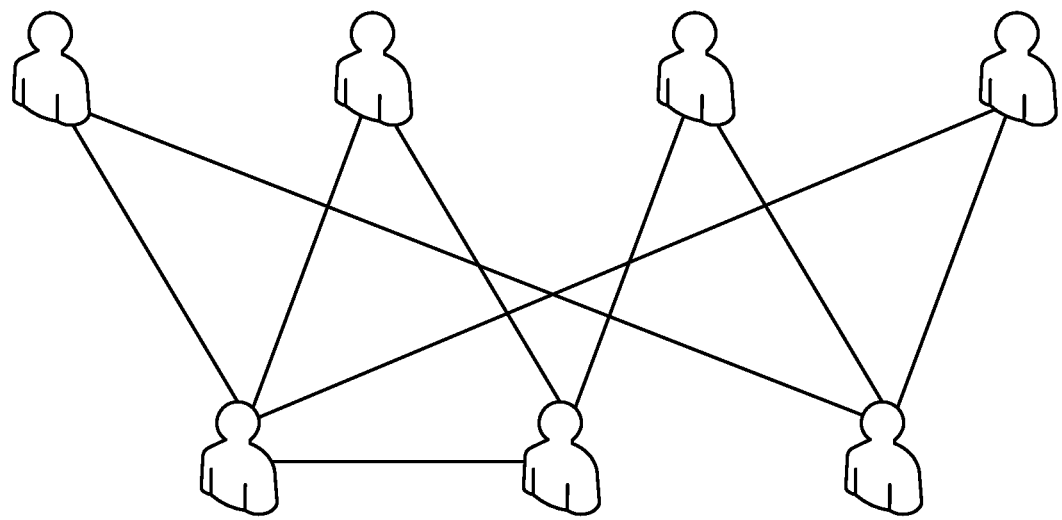
FIG. 1B is a interaction relationship network graph in another example.

FIG. 1A and FIG. 1B illustrate interaction network diagrams in specific examples. More specifically, FIG. 1A is a bipartite graph, which includes user nodes U1-U4 and product nodes (V1-V3). If a user has purchased a product, edges are established between the user and the product. FIG. 1B is a diagram illustrating a user transfer relationship, where each node represents a user, and there are edges between the two users for whom a transfer record has been generated.

However, it can be seen that although FIG. 1A and FIG. 1B illustrate an interaction relationship between objects, they do not include time sequence information of these interaction events. If embedding is performed based on such a simple interaction relationship network graph, obtained feature vectors do not express the influence of the time sequence information of the interaction events on the nodes. In addition, such a static graph is not highly scalable, and thus it is difficult to deal with new interaction events and new nodes flexibly.

In another solution, for each interaction object to be analyzed, a behavior sequence of the object is constructed, and the feature expression of the object is extracted based on the behavior sequence. However, such an action sequence represents only the behavior of the object to be analyzed, and the interaction event is a multi-party event, and the influence is indirectly transmitted between participants through the interaction event. As a result, this approach does not express the influence between the participants in the interaction event.

In consideration of the previous factors, according to one or more implementations of the present specification, a dynamic interaction graph is constructed based on dynamic interaction event sequences that are dynamically changed, where interaction objects involved in each interaction event corresponds to the nodes in the dynamic interaction graph. For the interaction object to be analyzed, a sequence related to a corresponding node is obtained from the dynamic interaction graph, and the sequence includes associated leaf nodes and positional encodings of the leaf nodes relative to the node to be analyzed, and the sequence is input into the Transformer-based neural network model to obtain the feature vector expression of the interaction object.

Figure 2:
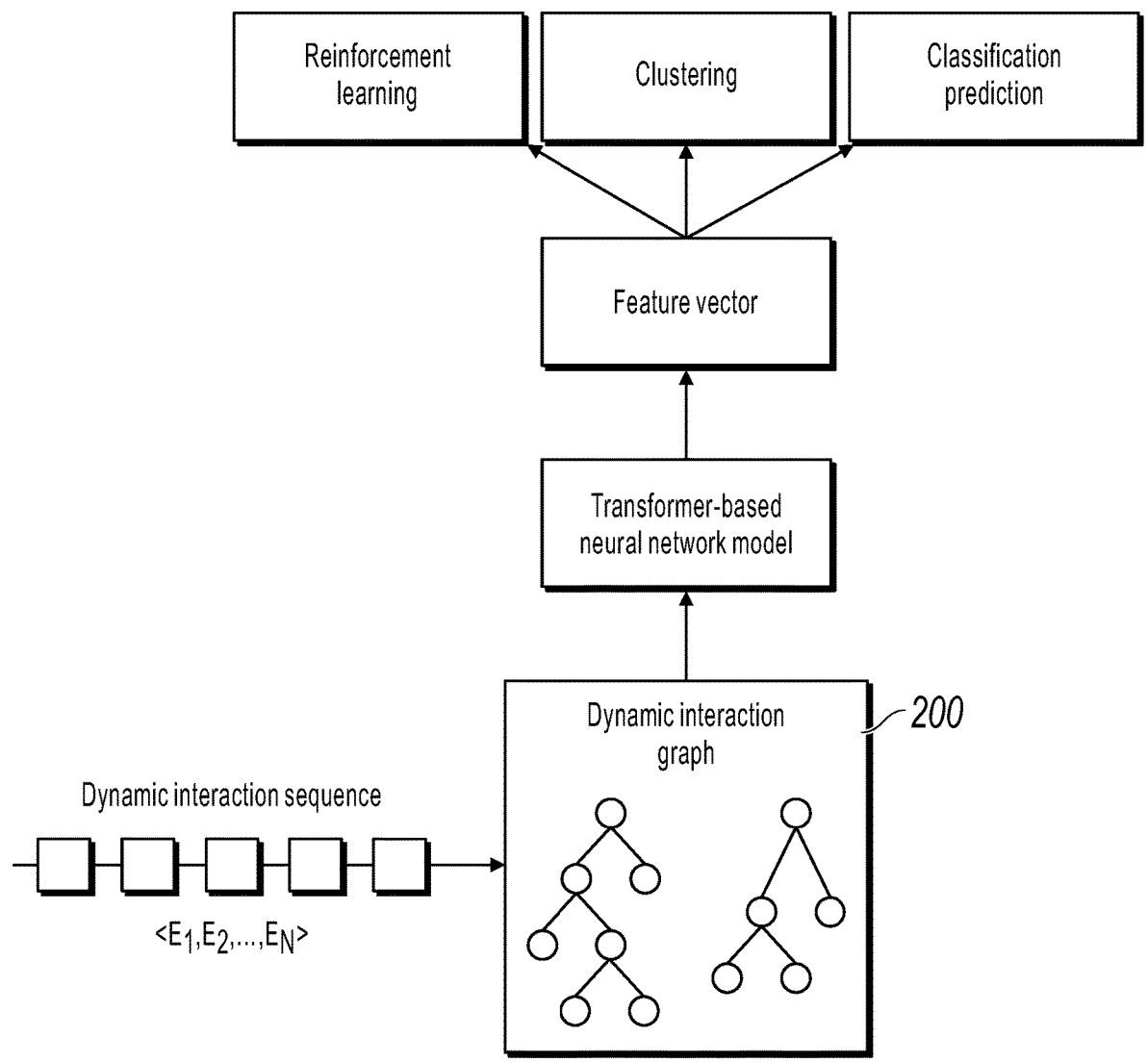
FIG. 2 is a schematic diagram illustrating an implementation scenario, according to an implementation.

FIG. 2 is a schematic diagram illustrating an implementation scenario, according to an implementation. As shown in FIG. 2, a plurality of interaction events that sequentially occur can be organized into a dynamic interaction sequence <$E_1, E_2, \ldots, E_N$> in chronological order, where each element $E_i$ denotes an interaction event and can be represented as an interaction feature group $E_i=(a_i, b_i, t_i)$, where $a_i$ and $b_i$ are two interaction objects of the event $E_i$, and $t_i$ is the interaction time.

According to the implementations of the present specification, a dynamic interaction graph 200 is constructed based on the dynamic interaction sequence. In the dynamic interaction graph 200, interaction objects $a_i$ and $b_i$ in each interaction event are represented by nodes, and edges are established between the events with the same object. A structure of the dynamic interaction graph 200 is described in more detail later.

For an interaction object to be analyzed, a current node corresponding to the interaction object in the dynamic interaction graph can be determined, and sequence data of the node whose root node is the current node in the dynamic interaction graph can be obtained. Generally, a certain quantity of leaf nodes reachable through the edges of the current node can be selected to form a node sequence. In addition, the positional encoding of each leaf node relative to the current node is obtained as the node sequence data. The sequence data reflects the influence imposed by other objects in interaction events directly or indirectly associated with the current interaction object on the current node.

Then, the node sequence data is input into the Transformer-based neural network model, and the feature vector of the current interaction object is obtained based on the model. The obtained feature vector can be used to extract the time sequence information of the associated interaction events and the influence between the interaction objects in each interaction event, so that deep features of the interaction object can be expressed more accurately. Such feature vectors can subsequently be used in various machine learning models and service scenarios. For example, reinforcement learning can be performed based on such feature vectors, or clustering can be performed based on the feature vectors, for example, clustering users into groups. In addition, classification prediction can be performed based on such feature vectors, for example, predicting whether an interaction will occur between two objects (for example, whether a user will purchase a product), or predicting a service classification of an object (for example, a risk level of a user).

The following describes a specific implementation of the previous conception.

Figure 3:
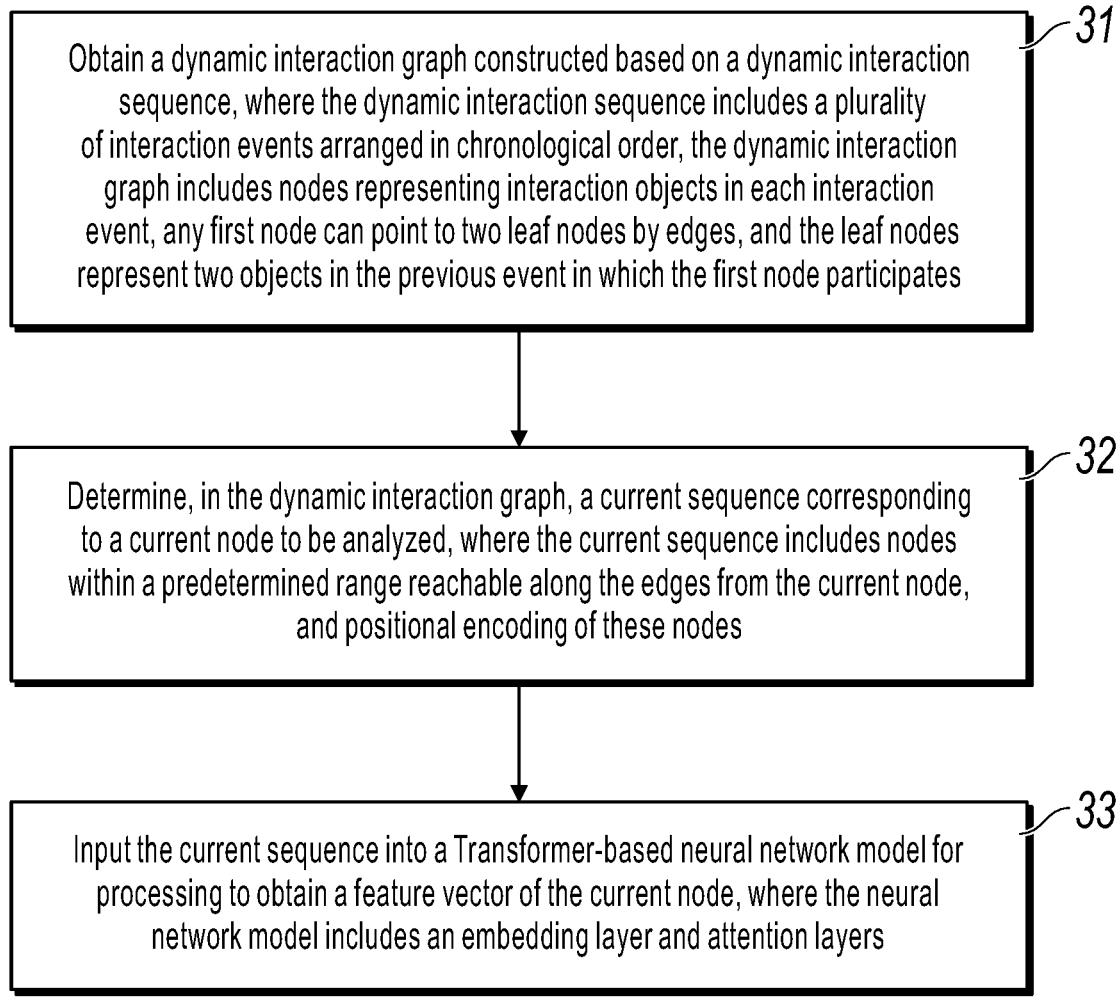
FIG. 3 is a flowchart illustrating a method for processing sequential interaction data, according to an implementation.

FIG. 3 is a flowchart illustrating a method for processing sequential interaction data, according to an implementation. It should be understood that the method can be performed by using any device, platform, or device cluster that has computation and processing capabilities. The following describes the steps in the method for processing sequential interaction data shown in FIG. 3 with reference to a specific implementation.

First, in step 31, a dynamic interaction graph constructed based on a dynamic interaction sequence is obtained.

As described above, a dynamic interaction sequence can include a plurality of interaction events arranged in chronological order. For example, the dynamic interaction sequence is expressed as $<E_1, E_2, \ldots, E_N>$, where $E_i$ denotes an interaction event and can be represented as an interaction feature group $E_i=(a_i, b_i, t_i)$, where $a_i$ and $b_i$ are two interaction objects of the event $E_i$, and $t_i$ is the interaction time. As such, in general, the dynamic interaction sequence includes a plurality of feature groups $(a_i, b_i, t_i)$ corresponding to a plurality of interaction events arranged in chronological order, and each interaction feature group includes at least two objects that interact (such as a first object and a second object) and the interaction time.

In an implementation, based on the features of an interaction event, the two objects that interact can be objects of different classifications, such as an object of a first classification and an object of a second classification. For example, on an e-commerce platform, an interaction event can be a user's purchase behavior, where the first object can be a user (the object of the first classification), and the second object can be a product (the object of the second classification). For another example, an interaction event can be a user's click behavior on a page block, where the first object can be a user (the object of the first classification), and the second object can be a page block (the object of the second classification).

In other implementations, two objects involved in an interaction event can be similar objects of the same classification. For example, in an instant messaging scenario, an interaction event can be instant messaging between two users. In this case, both the first object and the second object are users and are objects of the same classification. Alternatively, in an electronic payment platform, an interaction event can be a transfer between two users. In this case, both the first object and the second object are users of the electronic payment platform and are objects of the same classification.

In some other implementations, whether to differentiate the classifications of two interaction objects can be determined based on a service requirement. For example, for a transfer interaction event in the preceding example, the two users are considered to be of the same classification. In other examples, based on the service requirement, the transfer-out user can be considered as an object of a first classification, and the receiving user can be considered as an object of a second classification.

Further, in an implementation, the interaction feature group corresponding to each interaction event can further include a behavior feature f. As such, each interaction feature group can be represented as $X_i=(a_i, b_i, t_i, f)$. Specifically, the behavior feature f can include background and context information of an interaction, some attribute features of the interaction, etc. For example, if the interaction event is a user click event, the behavior feature f can include the classification of a terminal used by the user to perform the click behavior, a browser classification, an app version, etc.

A dynamic interaction graph can be constructed based on the dynamic interaction sequence described above. Specifically, each first object and second object in each feature group in the dynamic interaction sequence are used as nodes of the dynamic interaction graph. As such, a node can correspond to an object in a feature group of an interaction event, but the same physical object may correspond to a plurality of nodes. For example, if user U1 buys product M1 at time t1 and product M2 at time t2, there are two interaction feature groups (U1, M1, t1) and (U, M2, t2), then nodes UT (t1) and U (t2) are created for user U based on the two interaction feature groups. Therefore, a node in the dynamic interaction graph corresponds to the state of an interaction object in an interaction event.

For each node in the dynamic interaction graph, leaf nodes are determined and edges are constructed as follows. For any node i, assuming that the node corresponds to an interaction event i (the interaction time is t), then in the dynamic interaction sequence, the interaction event j (the interaction time is t−, where t− is earlier than t) of the first object u, which also contains the node i, is searched forward from the interaction event i (that is, traced back to the direction earlier than the interaction time t); that is, the last interaction event j in which the object u participates is searched. Two nodes corresponding to two objects in the interaction feature group of the last interaction event j are used as two leaf nodes of the node i, and the edges between the node i and the leaf nodes are established.

Figure 4:
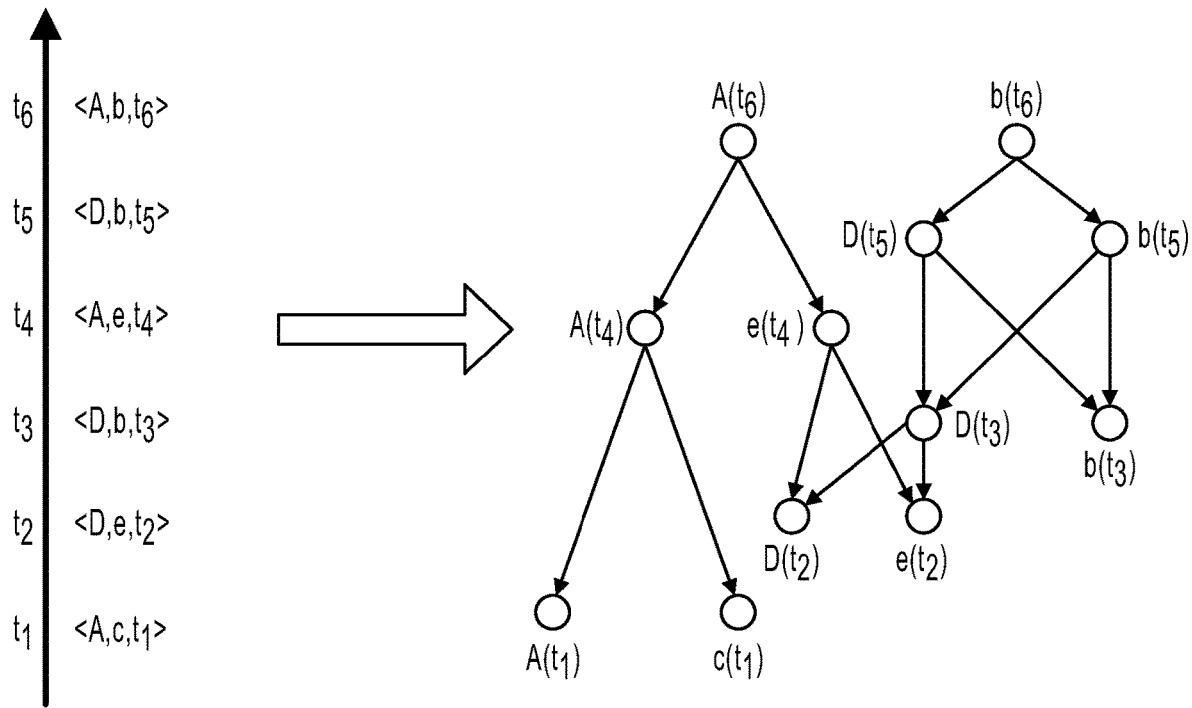
FIG. 4 is a flowchart illustrating a dynamic interaction sequence and a dynamic interaction graph constructed based on the dynamic interaction sequence, according to an implementation.

The following description is based on specific examples. FIG. 4 is a flowchart illustrating a dynamic interaction sequence and a dynamic interaction graph constructed based on the dynamic interaction sequence, according to an implementation. Specifically, the left side of FIG. 4 shows the dynamic interaction sequence organized in chronological order. For example, the interaction events $E_1, E_2, \ldots, E_6$ that respectively occur at $t_1, t_2, \ldots, t_6$ are shown, where the feature group of each interaction event includes two interaction objects involved in the interaction and as the interaction time. The right side of FIG. 4 shows a dynamic interaction graph constructed based on the dynamic interaction sequence on the left, where two interaction objects in each interaction event are used as nodes. Next, node A ($t_6$) is used as an example to describe determining of leaf nodes and construction of edges.

As shown in the figure, the node A ($t_6$) represents an interaction object A in the interaction event $E_6$. Therefore, during the tracing starting from the interaction event $E_6$, the detected last interaction event that includes the interaction object A is $E_4$; that is, $E_4$ is the last interaction event in which that A participates. Accordingly, two nodes in the feature group corresponding to $E_4$ are two leaf nodes of A ($t_6$). Then, the edges from node A ($t_6$) to the two nodes A ($t_4$) and e ($t_4$) corresponding to $E_4$ are established. Similarly, be tracing forward from A ($t_4$) (corresponding to interaction event $E_4$), the last interaction event $E_1$ in which object A participates can be detected, and then the edges that point from A ($t_4$) to the two nodes corresponding to $E_1$ are established. by tracing forward from e ($t_4$), the last interaction event $E_2$ in which the object e participates is detected, and then the edges that point from e ($t_4$) to the two nodes corresponding to $E_2$ are established. As such, the dependency between nodes is determined, and edges are established between nodes to form the dynamic interaction graph shown in FIG. 4.

It should be noted that, in the example shown in FIG. 4, the first object and the second object in each interaction event are objects of different classifications, which are differentiated by letter cases, that is, an uppercase letter represents an object of a first classification, and a lowercase letter represents an object of a second classification. When a feature group is organized for an interaction event, the feature group is arranged as < an object of a first classification, an object of a second classification, interaction time >. Accordingly, when a dynamic interaction graph is formed, the object classifications are also differentiated in a similar way, that is, nodes corresponding to the object of the first classification in the same interaction event are arranged on the left side, and nodes corresponding to the object of the second classification are arranged on the right side. As such, if a node has two leaf nodes, which include the left node and the right node, the left node corresponds to the object of the first classification, and the right node corresponds to the object of the second classification.

If object classifications do not need to be differentiated, the two interaction objects in the interaction feature group and the dynamic interaction graph can be arranged in any order.

The method for and the process of constructing a dynamic interaction graph based on a dynamic interaction sequence are described above. For the method for processing an interaction object shown in FIG. 3, the process of constructing a dynamic interaction graph can be performed in advance or on site. Accordingly, in an implementation, in step 31, a dynamic interaction graph is constructed on site based on a dynamic interaction sequence. The construction method is described above. In another implementation, a dynamic interaction graph can be constructed based on a dynamic interaction sequence in advance. In step 31, the formed dynamic interaction graph is read or received.

It should be understood that the dynamic interaction graph constructed in the previous way has high scalability and can be easily updated dynamically based on new interaction events. Accordingly, step 31 can further include a process of updating the dynamic interaction graph.

In an implementation, whenever a new interaction event is detected, the dynamic interaction graph is updated based on the new interaction event. Specifically, in this implementation, an existing dynamic interaction graph constructed based on existing interaction sequences can be obtained, and a feature group corresponding to a new interaction event, that is, a new feature group, can be obtained. Then, the first object and the second object that are included in the new interaction feature group are added to an existing dynamic interaction graph as two new nodes. In addition, for each newly added node, it is determined whether the node has leaf nodes. If yes, edges from the newly added node to the two leaf nodes of the newly added node are added, thus forming an updated dynamic interaction graph.

In another implementation, a newly added interaction event can be detected at a predetermined time interval, such as every other hour, and a plurality of newly added interaction events in that time interval can be used to form a new interaction sequence. Alternatively, whenever a predetermined quantity (for example, 100) of new interaction events is detected, the predetermined quantity of new interaction events are used to form a new interaction sequence. Then, the dynamic interaction graph is constructed based on the new interaction sequence.

Specifically, in this implementation, an existing dynamic interaction graph constructed based on existing interaction sequences can be obtained, and the new interaction sequence described above can be can be obtained, where the new interaction sequence includes a plurality of newly added interaction feature groups. Then, for each new interaction feature group, the first object and the second object that are included in the new interaction feature group are added to an existing dynamic interaction graph as two new nodes. In addition, for each newly added node, it is determined whether the node has leaf nodes. If yes, edges from the newly added node to the two leaf nodes of the newly added node are added, thus forming an updated dynamic interaction graph.

In summary, in step 31, a dynamic interaction graph constructed based on a dynamic interaction sequence is obtained. Next, in step 32, in the obtained dynamic interaction graph, a current sequence corresponding to the current node to be analyzed is determined, where the current sequence includes a plurality of nodes within a predetermined range reachable from the current node through edges, and positional encoding of each of the plurality of nodes relative to the current node in the dynamic interaction graph.

The current node is a node corresponding to the interaction object to be analyzed. However, as described above, an interaction object can correspond to a plurality of nodes to express the states of the interaction object in different interaction events at different times. In order to express the latest state of the interaction object to be analyzed, in an implementation, a node that has no edge in the dynamic interaction graph is selected as a current node. That is, the node corresponding to the last interaction event in which the object to be analyzed participates is selected as the current node. For example, in the dynamic interaction graph shown in FIG. 4, when the interaction object A needs to be analyzed, node A ($t_6$) can be selected as the current node. However, this is not mandatory. In other implementations, for example, for the training purpose, another node can be selected as the current node; for example, for analyzing object A, node A ($t_5$) can alternatively be selected as the current node.

The current node can be used as the root node. The nodes that are sequentially reachable from the edges of the root node are obtained, and the positional encodings of these nodes relative to the root node are determined. The combinations of the nodes within the predetermined range and their positional encodings are arranged in order to form the current sequence corresponding to the current node.

In an implementation, the nodes within the predetermined range can be the nodes reachable through a predetermined quantity K of edges. The number K here is a predetermined hyperparameter, which can be selected based on the service condition. It should be understood that the predetermined number K represents the quantity of steps of the historical interaction event that is traced forward for expressing information about the current node. A larger number K indicates that earlier historical interaction information is considered.

In another implementation, the nodes within the predetermined range can alternatively be the nodes whose interaction times are within a predetermined time range. For example, the nodes within the predetermined range can be nodes that are detected by tracing forward from the interaction time of the current node for a period (for example, one day) and that are reachable from the edges of the current node.

In another implementation, the predetermined range takes into consideration both the quantity of edges and the time range. In other words, the nodes within the predetermined range can be the nodes that are reachable through a predetermined quantity K of edges and whose interaction times are within the predetermined time range.

In obtaining the nodes within the predetermined range, in an implementation, traversal is performed along the edges based on the width-first principle. In another implementation, traversal is performed based on the depth-first principle. Alternatively, in other implementations, traversal can be performed in another topology sorting way.

For each node within the predetermined range that is obtained through traversal, the positional encoding of the node relative to the root node is determined. In an implementation, the positional encoding can include the quantity of edges that the node passes relative to the root node, or can be referred to as an order.

In an implementation, as described above, the interaction objects in a dynamic interaction graph are classified into objects of a first classification and objects of a second classification. The object of the first classification is arranged on the left side of two nodes of the same interaction event as a left node, and the object of the second classification is arranged on the right side of the two nodes as a right node. In this case, the positional encoding further indicates whether the node is a left node or a right node.

Figure 5:
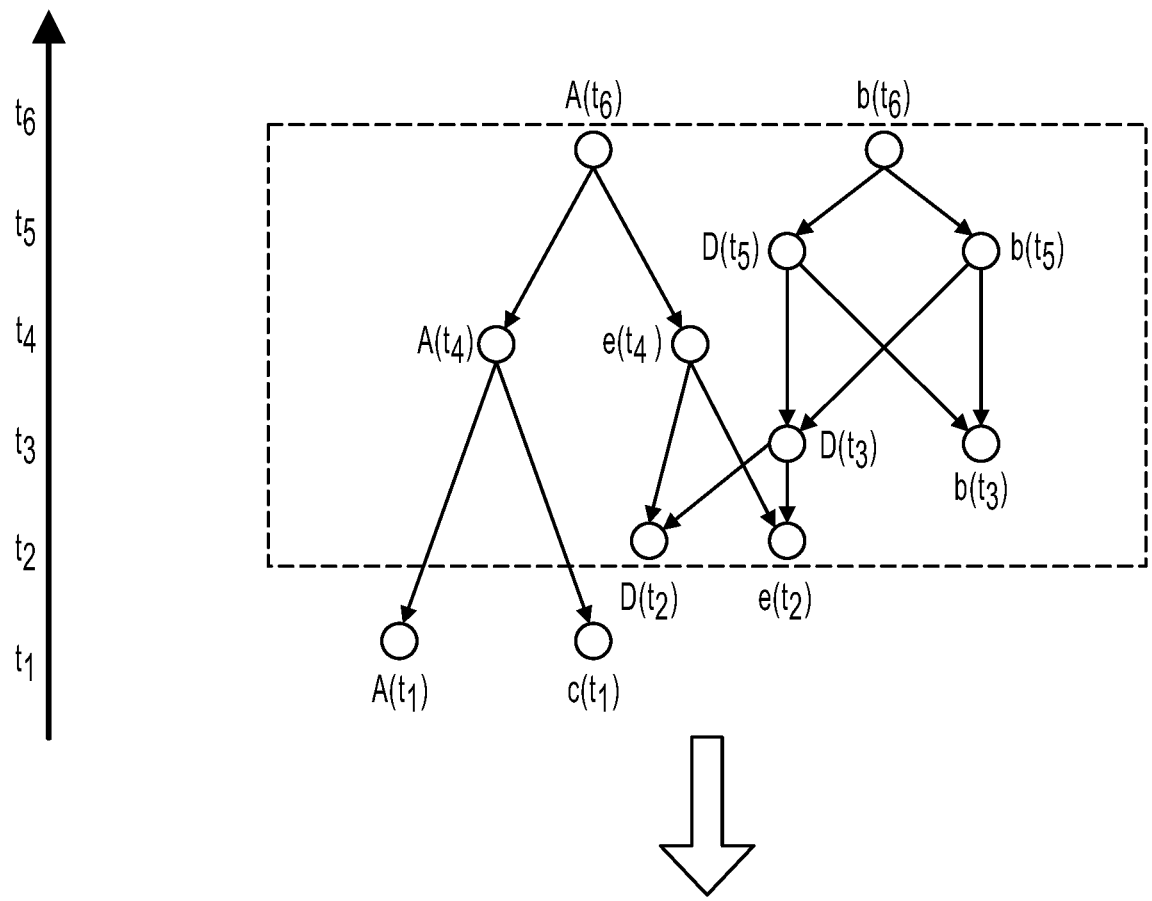
FIG. 5 illustrates an example of a current sequence, according to an implementation.

FIG. 5 illustrates an example of a current sequence, according to an implementation. In the example shown in FIG. 5, assume that A ($t_6$) and b ($t_6$) in FIG. 4 are current nodes, respectively, and that the predetermined range is a certain time range, that is, from the interaction time of the current node to the earliest time $t_2$. The dotted box in FIG. 5 shows the nodes within the predetermined time range described above.

A ($t_6$) is used as the root node, traversal is performed along the edges, and then the nodes reachable through the edges within the predetermined range can be obtained, including A ($t_6$), A ($t_4$), e ($t_4$), D ($t_2$), and e ($t_2$). Below these nodes are their positional encodings, which are shown in the form of L/Rn, where L/R indicates whether the node is a left node or a right node, and n indicates the quantity of edges that the root node passes. For example, the positional encoding L2 of node D ($t_2$) indicates that the node is a left node and is connected to the root node through two edges. The combinations of nodes and their positional encodings arranged in order form the current sequence corresponding to the current node. The right side of FIG. 5 shows sequence 1 that is obtained by using A ($t_6$) as the current node and sequence 2 that is obtained by using b ($t_6$) as the current node. Sequences corresponding to other nodes can also be obtained in a similar way.

Next, in step 33, the current sequence is input into the Transformer-based neural network model, and the current sequence is processed by using this model to obtain the feature vector corresponding to the current node.

As understood by a person skilled in the art, a Transformer-based model is usually used to perform natural language processing (NLP) tasks. The core feature of the Transformer-based model is its unique attention mechanism. When processing a natural language, such as a sentence, the Transformer model uses the attention mechanism to assign different attention coefficients to the word vectors in the sentence, so that the influence of the word in the sentence is considered more comprehensively. To inherit the way of processing a word sequence corresponding to a sentence from the Transformer-based model, in the implementations of the present specification, Transformer-based model is used to process the current sequence obtained from the dynamic interaction graph for the current node.

Figure 6:
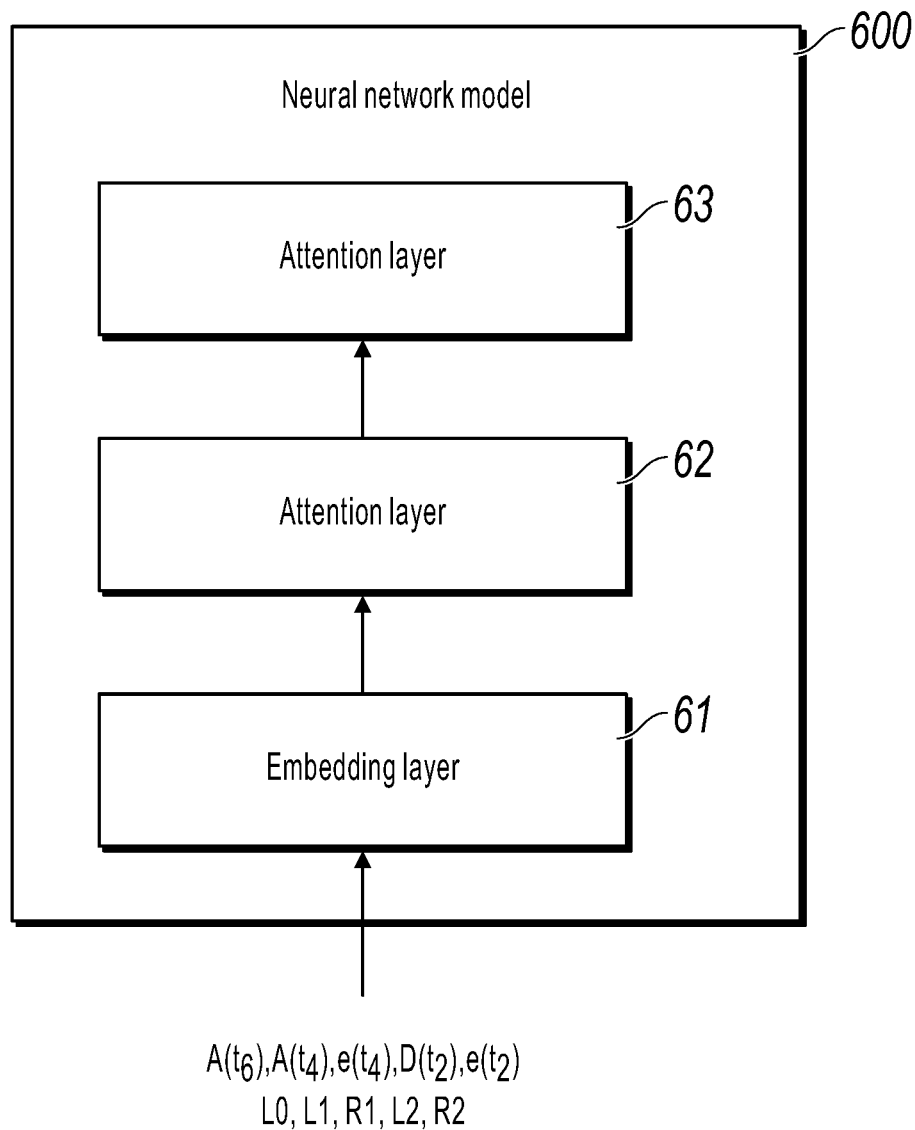
FIG. 6 is a schematic structural diagram illustrating a Transformer-based neural network model, according to an implementation.

FIG. 6 is a schematic structural diagram illustrating a Transformer-based neural network model, according to an implementation. As shown in FIG. 6, the neural network model 600 includes an embedding layer 61 and attention layers 62 and 63. The embedding layer 61 obtains N embedded vectors based on node features and positional encodings of the nodes in the current sequence. The attention layer 62 is connected to the embedding layer 61. N embedded vectors are obtained from the embedding layer as input vectors, and the input vectors are combined based on the degree of correlation between the N input vectors to obtain N output vectors. Then the N output vectors are output to the subsequent attention layer 63. The attention layer 63 obtains the output of the preceding layer as an input vector, and performs an operation similar to that of the attention layer 62.

It should be understood that the structure shown in FIG. 6 is only an example, and the quantity of attention layers can be set as required. For example, one or more attention layers can be set. The neural network model determines the feature vector of the current node based on the N output vectors obtained from all the attention layers.

The following describes a specific operation process of each layer.

First, the embedding layer 61 obtains the current sequence corresponding to the current node. As described above, the current sequence a plurality of nodes within a predetermined range reachable from the current node through edges and positional encoding of each of the plurality of nodes relative to the current node. It should be understood that the length of the current sequence may vary with different current nodes, as shown in the example shown in FIG. 5. Therefore, a relatively great length N can be predetermined. If the actual length of the current sequence is less than N, vacancies are padded using default values. After the default values are padded, it can be considered that the length of the current sequence is N, that is, the current sequence includes N nodes and corresponding N positional encodings. Then, the embedding layer 61 can embed the node features and positional encoding of each node, and then combine them to obtain an initial embedded vector.

Specifically, the embedding layer can embed the node features of each node in the N nodes to obtain the N node embedded vectors. If a node represents a user, the node features can include attribute features of the user, such as age, occupation, education level, and area. If a node represents a product, the node features can include attribute features of the product, such as product classification, shelf time, and sales volume. When a node represents another interaction object, the original node features can be obtained accordingly. When the interaction feature group also includes the behavior feature f, the node features can also include the behavior feature f in the corresponding feature group.

In addition, the embedding layer embeds N positional encodings corresponding to N nodes to obtain N position embedded vectors.

Then, the N node embedded vectors and N position embedded vectors are combined. For example, N embedded vectors $<A_1, A_2, \ldots, A_N>$ are obtained through direct addition, weighted combination, etc.

The following describes operations of the attention layer. The attention layer obtains N input vectors $<X_1, X_2, \ldots, X_N>$ from the preceding layer, which can be expressed as matrix X. Then the attention layer uses the self-attention mechanism to transform, based on the degree of correlation between the input vectors, the input vectors to obtain N output vectors $<Y_1, Y_2, \ldots, Y_N>$, which can be expressed as matrix Y. It should be understood that when the attention layer is directly connected to the embedding layer, for example, the attention layer 62 in FIG. 6, the obtained input vectors are the embedded vectors $<A_1, A_2, \ldots, A_N>$; or when the attention layer is a subsequent attention layer, for example, the attention layer 63 in FIG. 6, the obtained input vectors are the output vectors $<Y_1, Y_2, \ldots, Y_N>$ of the preceding attention layer.

Figure 7:
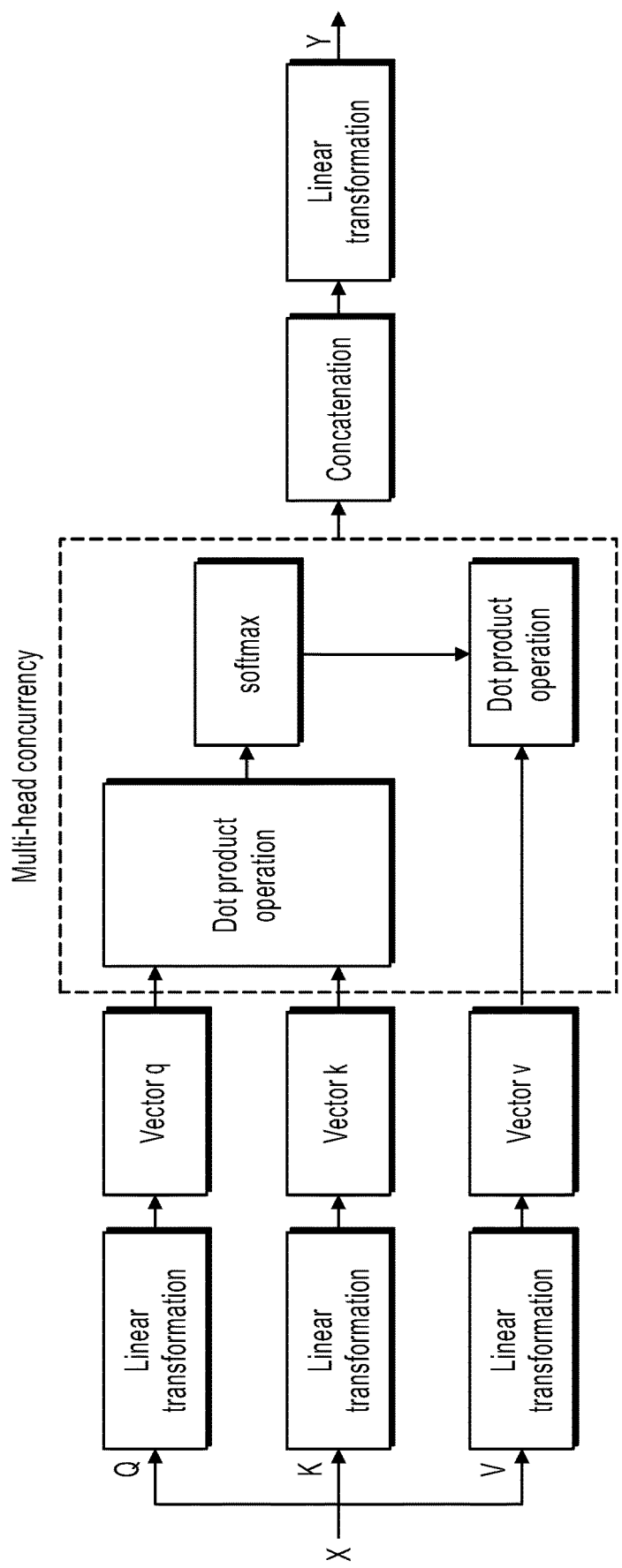
FIG. 7 is a schematic diagram illustrating operations of an attention layer, according to an implementation.

FIG. 7 is a schematic diagram illustrating operations of an attention layer, according to an implementation. The schematic diagram shows how the attention layer converts the input matrix X into the output matrix Y.

As shown in the figure, a first transformation matrix Q, a second transformation matrix K, and a third transformation matrix V are used to transform each input vector i in the N input vectors $<X_1, X_2, \ldots, X_N>$, to respectively obtain a first intermediate vector (vector q), a second intermediate vector (vector k), and a third intermediate vector (vector v). In operation, the first transformation matrix Q, the second transformation matrix K, and the third transformation matrix V can be respectively used to transform the input matrix X formed by the N input vectors to obtain the matrix Q, the matrix K, and the matrix V of the input matrix, and then the matrices are respectively split to obtain the vector q, vector k, and vector v corresponding to the input vectors.

For any input vector $X_i$ in the N input vectors, the degree of correlation between the input vector $X_i$ and each input vector $X_j$ is determined based on the dot product operation performed on the first intermediate vector (vector q, qi) corresponding to the $i^{th}$ input vector and each second intermediate vector (vector k, $k_j$) corresponding to each input vector $X_j$.

Although the result of the dot product operation performed on $q_i$ and $k_j$ can also be directly determined as the degree of correlation, more classically, the result of the dot product operation is divided by a constant, and then the softmax operation is performed, and the operation result is used as the degree of correlation between the input vectors $X_i$ and $X_j$, that is:

$$\alpha_{i,j} = softmax\left(\frac{q_i \cdot k_j}{\sqrt{d_k}}\right) \quad (1)$$

Then, the third intermediate vector (vector v, $v_j$) corresponding to each input vector $X_j$ can weighted by using the correlation between the $i^{th}$ input vector $X_i$ and each input vector $X_j$ as a weighting factor to obtain the $i^{th}$ combination vector $C_i$ corresponding to the $i^{th}$ input vector X.

$$C_i = \sum_{j=1}^{N} \alpha_{i,j} v_j \quad (2)$$

Therefore, the vector sequence $<C_1, C_2, \ldots, C_N>$ of N combination vectors or the matrix C corresponding to N input vectors can be obtained. Based on the combination vector sequence, N output vectors can be obtained.

Specifically, in an implementation, the vector sequence of the N combination vectors can be directly used as the N output vectors, that is, $Y_i=C_i$. In this case, the output matrix Y is the combination vector matrix C, which can also be written as follows:

$$Y = softmax\left(\frac{QK^T}{\sqrt{d_k}}\right)V \quad (3)$$

In another implementation, the attention layer uses a multi-head attention mechanism, that is, the attention layer maintains m sets of transformation matrices, and each set of transformation matrices includes the first transformation matrix Q, the second transformation matrix K, and the third transformation matrix V, so that the previous operations can be performed concurrently to obtain m combination vector sequences (that is, m matrices C), where each vector sequence includes N combination vectors obtained based on one set of transformation matrices.

In this case, the attention layer concatenates the m combination vector sequences to obtain a concatenated matrix, and then the concatenated matrix is transformed by using the fourth transformation matrix W to obtain the final output matrix Y. The output matrix Y is split to correspond to N output vectors $<Y_1, Y_2, \ldots, Y_N>$.

Through the previous operation process, the attention layer performs transformation operation based on the degree of correlation between the N input vectors to obtain N output vectors.

As described above, the neural network model can include a plurality of attention layers. In an implementation, the plurality of attention layers can be stacked in a residual network way to form a neural network model.

If there are a plurality of attention layers, in an implementation, the neural network model can combine the N output vectors obtained by each of the plurality of attention layers to obtain the feature vector of the current node. In another implementation, the neural network model can extract only the N output vectors from the last attention layer and combine the N output vectors to obtain the feature vector of the current node.

As such, the neural network model obtains the feature vector of the current node based on the current sequence corresponding to the current node to be analyzed in many ways. Because the current sequence includes each leaf node related to the current node and the positions of these leaf nodes relative to the current node, the information reflects the interaction history of the interaction object corresponding to the current node, in this way, the feature vector of the current node not only expresses the features of the interaction object itself, but also expresses the influence of the interaction object on the interaction events, so that the characteristics of the interaction object can be fully represented.

It should be understood that the neural network model relies on a large quantity of parameters, such as the parameters in the previous transformation matrices (matrix Q, matrix K, matrix V, etc.), in the process of determining the feature vector of the current node. These parameters need to be determined by training the neural network model. In different implementations, the neural network model can be trained by performing different tasks.

Figure 8:
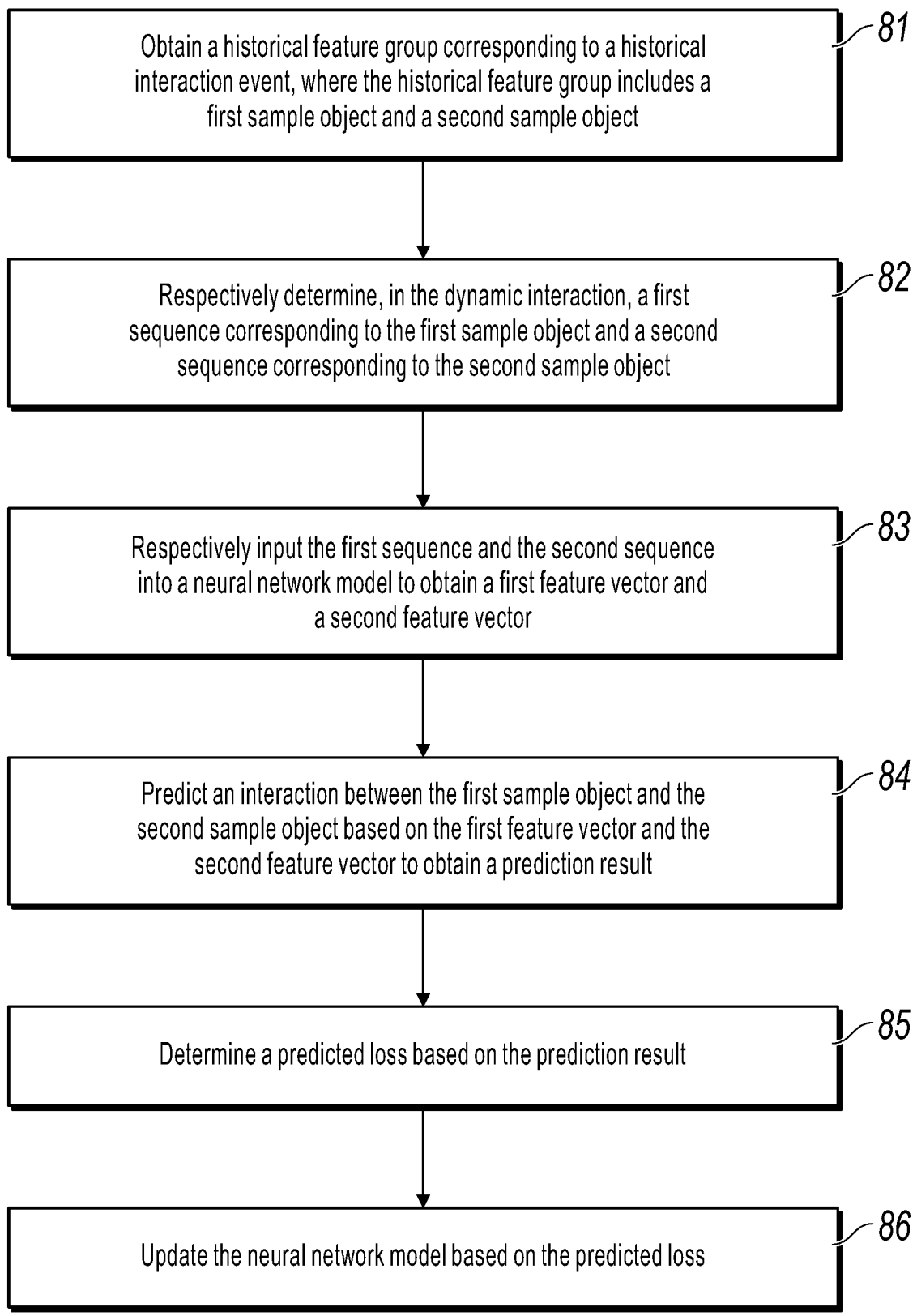
FIG. 8 is a flowchart illustrating training a neural network model, according to an implementation.

In an implementation, the neural network model is trained by predicting an interaction. FIG. 8 is a flowchart illustrating training a neural network model, according to another implementation. As shown in FIG. 8, in step 81, a historical feature group corresponding to a historical interaction event is obtained, where the historical feature group is the feature group corresponding to the historical interaction event that has occurred. In a specific example, a historical interaction feature group can be obtained from the previous dynamic interaction sequence. Two objects included in the historical interaction feature group are called a first sample object and a second sample object.

In step 82, a first sequence corresponding to a first sample object and a second sequence corresponding to the second sample object are respectively determined in the dynamic interaction graph. Specifically, a first node corresponding to the first sample object and a second node corresponding to the second sample object are respectively determined in the dynamic interaction graph, and the first node and the second node are respectively used as current nodes to determine the corresponding first sequence and the corresponding second sequence in a way similar to step 32 in FIG. 3.

Then, in step 83, the first sequence and the second sequence are respectively input into a neural network model to obtain a first feature vector corresponding to the first sample object and a second feature vector corresponding to the second sample object. For a specific process in which the neural network model determines the feature vector of the corresponding sample object based on the node and its positional encoding, references can be referred to the description about step 33. Detailed description is omitted here.

Next, in step 84, if there's an interaction between the first sample object and the second sample object is predicted based on the first feature vector and the second feature vector to obtain a prediction result. Usually, a binary classifier can be used to predict whether an interaction occurs between two sample objects.

Then, in step 85, a predicted loss is determined based on the previous prediction result. It should be understood that the first sample object and the second sample object are obtained from the feature group of the history interaction event, so an interaction has actually occurred, which means that a label of the relationship between the two sample objects is known. According to the form of loss function, such as the cross entropy calculation method, the loss of this prediction can be determined based on the previous prediction result.

Then, in step 86, the neural network model is updated based on the predicted loss. Specifically, the parameters of neural network can be adjusted in ways such as gradient descent and backward propagation to update the neural network model, until the prediction accuracy of the neural network model satisfies the requirement.

The object relationship is predicted by using two sample objects in historical interaction events, which is equivalent to training with positive samples. In an implementation, two sample objects in a dynamic interaction graph that do not interact with each other can be used as negative samples for further training to achieve better training effects.

Figure 9:
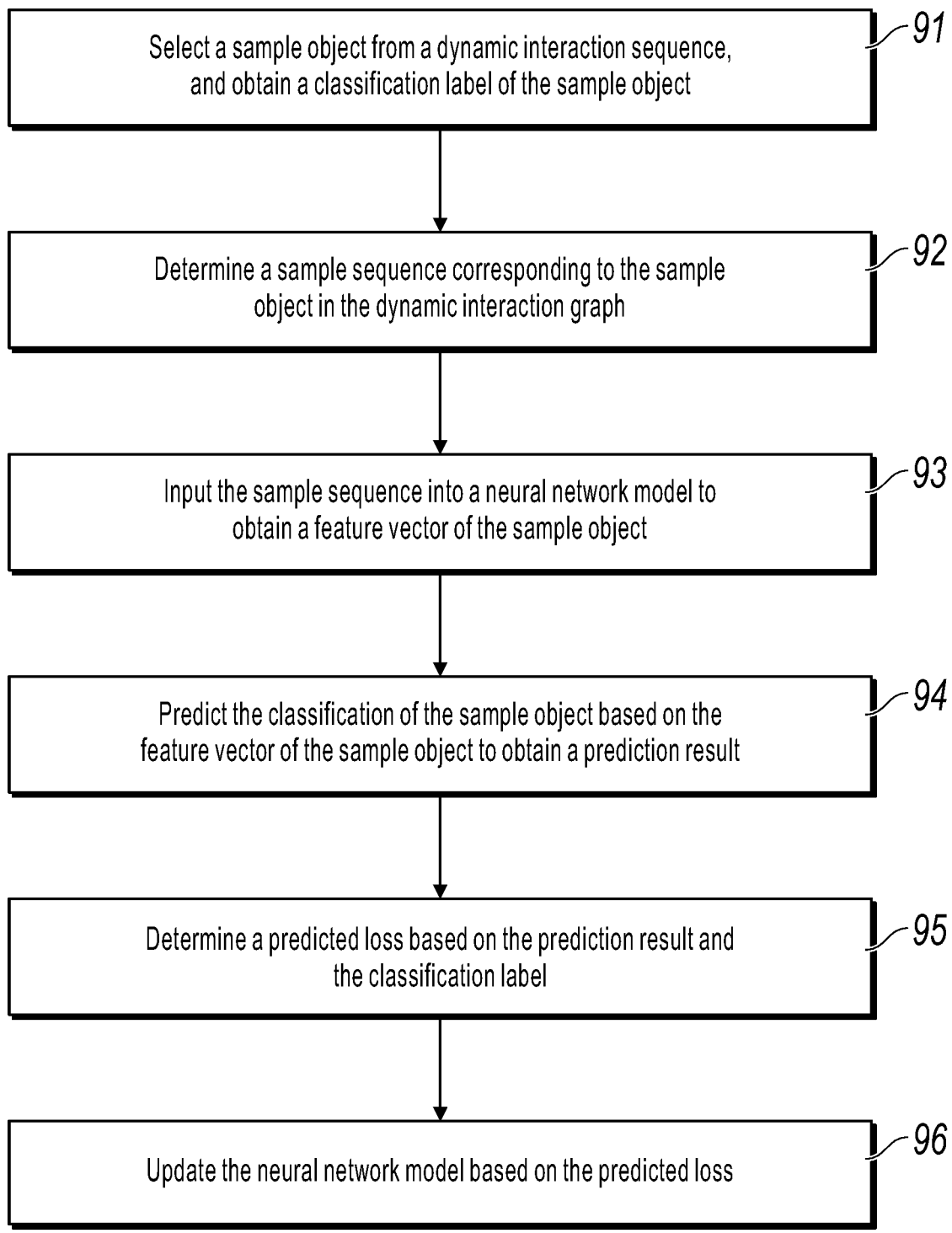
FIG. 9 is a flowchart illustrating training a neural network model, according to another implementation.

According to another implementation, the neural network model is trained by predicting classifications of interaction objects. FIG. 9 is a flowchart illustrating training a neural network model, according to another implementation. As shown in FIG. 9, in step 91, a sample object is selected from a dynamic interaction sequence, and a classification label of the sample object is obtained. The sample object can be any interaction object in any feature group included in the dynamic interaction sequence, and the classification label of the sample object can be a label related to a service scenario. For example, if the sample object is a user, the classification label can be a predetermined user group label, or a user risk level label; or if the sample object is a product, the classification label can be a product classification label. Such labels can be generated through manual labeling or other service-related processing.

In step 92, a sample sequence corresponding to the sample object is determined in the dynamic interaction graph. Specifically, a node corresponding to the sample object can be determined in a dynamic interaction graph, and a corresponding sample sequence is determined by using the node as a current node and in a way similar to step 32 in FIG. 3.

Then, in step 93, the sample sequence is input into a neural network model to obtain a feature vector of the sample object. For a specific process, references can be made to the description about step 33. Detailed description is omitted here for simplicity.

Next, in step 94, the classification of the sample object is predicted based on the feature vector of the sample object to obtain a prediction result. A classifier can be used to predict the probability that a sample is of a classification.

Then, in step 95, the predicted loss is determined based on the prediction result and the classification label. For example, the cross entropy calculation method can be used to predict the probability and classification label in the result, and the loss of this prediction can be determined.

In step 96, the neural network model is updated based on the predicted loss. As such, the neural network model is trained by performing the task of predicting classifications of the sample objects.

In summary, in the implementations of the present specification, a dynamic interaction graph is constructed based on the dynamic interaction sequence, where the dynamic interaction graph reflects a time sequence relationship between the interaction events, and mutual influence transferred between the interaction objects through interaction events. Feature vectors of an interaction object can be extracted based on anode sequence that is related to the interaction object in the dynamic interaction graph and a trained Transformer-based neural network model. As such, the influence of other interaction objects in each interaction event is introduced into the feature vector, so that deep features of the interaction object can be comprehensively expressed.

Figure 10:
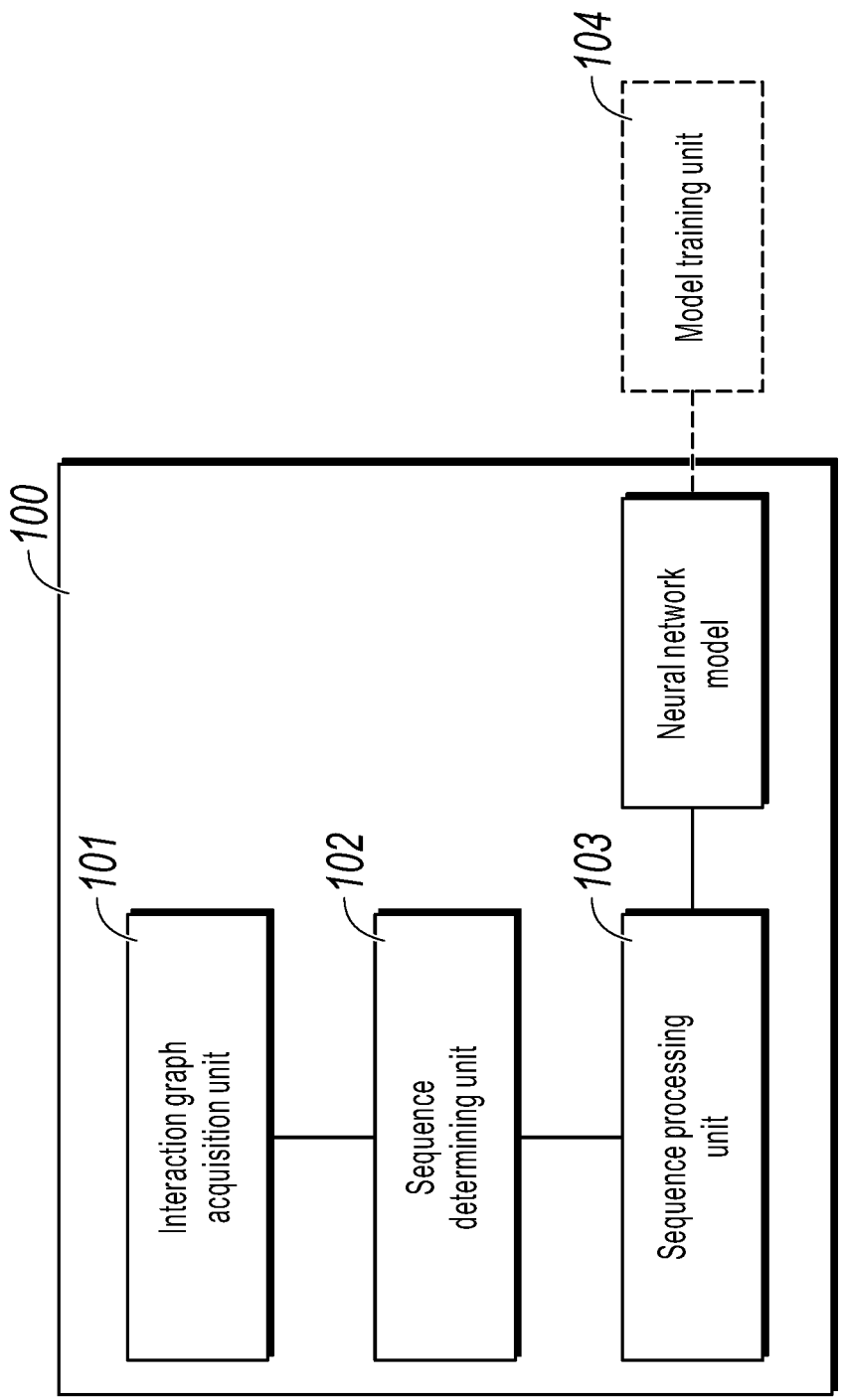
FIG. 10 is a schematic block diagram illustrating a device for processing sequential interaction data, according to an implementation.

According to an implementation of another aspect, a device for processing sequential interaction data is provided, where the device can be deployed in any device, platform, or device cluster that has computation and processing capabilities. FIG. 10 is a schematic block diagram illustrating a device for processing sequential interaction data, according to an implementation. As shown in FIG. 10, the device 100 includes:

an interaction graph acquisition unit 101, configured to obtain a dynamic interaction graph constructed based on a dynamic interaction sequence, where the dynamic interaction sequence includes a plurality of interaction feature groups corresponding to a plurality of interaction events arranged in chronological order, and each interaction feature group includes a first object, a second object, and an interaction time of an interaction; and the dynamic interaction graph includes a plurality of nodes that represent each first object and each second object in each interaction feature group, the plurality of nodes include a first node, the first node points to two leaf nodes by edges, and the two leaf nodes respectively represent two objects in an interaction feature group corresponding to the last interaction event in which the interaction object corresponding to the first node participates;

a sequence determining unit 102, configured to determine, in the dynamic interaction graph, a current sequence corresponding to a current node to be analyzed, where the current sequence includes a plurality of nodes within a predetermined range reachable from the current node through edges and positional encoding of each of the plurality of nodes relative to the current node in the dynamic interaction graph; and a sequence processing unit 103, configured to input the current sequence into a Transformer-based neural network model, where the neural network model includes an embedding layer and at least one attention layer; obtain, at the embedding layer, N embedded vectors based on node features and the positional encoding of each node in the current sequence; combine, at each attention layer, input vectors based on the degree of correlation between the N input vectors obtained from the preceding layer to obtain N output vectors; and determine, by the neural network model, the feature vector corresponding to the current node based on the N output vectors obtained by the at least one attention layer.

In an implementation, the interaction graph acquisition unit 101 is configured to: obtain an existing dynamic interaction graph constructed based on an existing interaction sequence; obtain a new interaction feature group corresponding to a new interaction event; add the first object and the second object included in the new interaction feature group to the existing dynamic interaction graph as two new nodes; and for each new node that has a leaf node, add edges from the new node to its two leaf nodes.

In another implementation, the interaction graph acquisition unit 101 is configured to: obtain an existing dynamic interaction graph constructed based on an existing interaction sequence; obtain a new interaction sequence, where the new interaction sequence includes a plurality of new interaction feature groups corresponding to a plurality of new interaction events; for each new interaction feature group, add the first object and the second object to an existing dynamic interaction graph as two new nodes; and for each new node that has a leaf node, add edges from the new node to its two leaf nodes.

According to an implementation, the current node is a node that has no edge.

According to different implementations, the nodes within the predetermined range can include: any node within a predetermined quantity K of edges; and/or any node whose interaction time is within a predetermined range.

In an implementation, the first object and the second object in a feature group are respectively an object of a first classification and an object of a second classification, the two leaf nodes include a left node and a right node, the left node corresponds to an object of a first classification in the last interaction event, and the right node corresponds to an object of a second classification in the last interaction event.

In this case, the positional encoding includes the quantity of edges that each node passes relative to the current node, and whether the node is the left node or the right node.

In an implementation, each interaction feature group further includes a behavior feature of an interaction; and in this case, the node features and the positional encoding of each node in the current sequence can include attribute features of an interaction object corresponding to the node and behavior features of an interaction feature group in which the node is located.

In an implementation, the embedding layer in the neural network model used by the sequence processing unit 103 is specifically configured to: embed the node features of each node to obtain N node embedded vectors; embed the positional encoding of each node to obtain N position embedded vectors; and synchronize the N node embedded vectors and the N position embedded vectors to obtain the N embedded vectors.

According to an implementation, each attention layer in the neural network model used by the sequence processing unit 103 is configured to: use a first transformation matrix Q, a second transformation matrix K, and a third transformation matrix V to transform each of the N input vectors to obtain a first intermediate vector, a second intermediate vector, and a third intermediate vector corresponding to each of the N input vectors; for any $i^{th}$ input vector in the N input vectors, determine the degree of correlation between the $i^{th}$ input vector and each input vector based on the dot product operation performed on the first intermediate vector corresponding to the $i^{th}$ input vector and each second intermediate vector corresponding to each input vector; perform weighted combination on the third intermediate vector corresponding to each input vector by using the degree of correlation between the $i^{th}$ input vector and each input vector as a weighting factor to obtain the $i^{th}$ combination vector corresponding to the $i^{th}$ input vector; and obtain N output vectors based on each combination vector corresponding to each input vector.

Further, in an implementation, each attention layer maintains m sets of transform matrices, and each set of transform matrices includes the first transform matrix Q, the second transform matrix K, and the third transform matrix V, so as to obtain m vector sequences, each vector sequence including N combination vectors obtained based on a set of transform matrices; and each attention layer is further configured to: concatenate the m vector sequences to obtain a concatenated matrix; and transform the concatenated matrix by using a fourth transformation matrix, and split the matrix obtained through transformation into N vectors as the N output vectors.

According to an implementation, the at least one attention layer refers to a plurality of attention layers including a first attention layer connected to the embedding layer and subsequent attention layers, the first attention layer obtains the N embedded vectors from the embedding layer as its N input vectors, and each subsequent attention layer obtains the N output vectors obtained by the preceding attention layer as its N input vectors.

In this case, in an implementation, the neural network model combines the N output vectors obtained by each of the plurality of attention layers to obtain a feature vector of the current node.

In another implementation, the neural network model combines the N output vectors obtained by the last of the plurality of attention layers to obtain a feature vector of the current node.

According to an implementation, the neural network model is trained by using the model training unit 104. The model training unit 104 can be included in or located outside the device 100. The model training unit 104 can include (not shown): a sample acquisition module, configured to obtain a historical feature groups corresponding to a historical interaction event, where the historical feature group includes a first sample object and a second sample object; a sequence determining module, configured to determine, in the dynamic interaction graph, a first sequence corresponding to the first sample object and a second sequence corresponding to the second sample object; a vector acquisition module, configured to respectively input the first sequence and the second sequence into the neural network model to obtain a first feature vector corresponding to the first sample object and a second feature vector corresponding to the second sample object; a prediction module, configured to predict, based on the first feature vector and the second feature vector, whether the first sample object and the second sample object interact, to obtain a prediction result; a loss determining module, configured to determine a predicted loss based on the prediction result; and an updating module, configured to update the neural network model based on the predicted loss.

In another implementation, the model training unit 104 can include (not shown): a sample acquisition module, configured to select a sample object from the dynamic interaction sequence, and obtaining a classification label of the sample object; a sequence determining module, configured to determine, in the dynamic interaction graph, a sample sequence corresponding to the sample object; a vector acquisition module, configured to input the sample sequence into the neural network model to obtain a feature vector of the sample object; a prediction module, configured to predict a classification of the sample object based on the feature vector of the sample object to obtain a prediction result; a loss determining module, configured to determine a predicted loss based on the prediction result and the classification label; and an updating module, configured to update the neural network model based on the predicted loss.

According to the previous device, a Transformer-based neural network model is used to process the interaction objects based on the dynamic interaction graph, and feature vectors suitable for subsequent analysis are obtained.

According to an implementation of another aspect, a computer readable storage medium is further provided, where the computer readable storage medium stores a computer program, and when the computer program is executed in a computer, the computer is enabled to perform the method described with reference to FIG. 3.

According to an implementation of yet another aspect, a computing device is further provided, including a memory and a processor, where the memory stores executable code, and when the processor executes the executable code, the method described with reference to FIG. 3 is implemented.

A person skilled in the art should be aware that, in one or more of the above examples, the functions described in the present specification can be implemented by using hardware, software, firmware, or any combination thereof. When these functions are implemented by software, they can be stored in a computer readable medium or transmitted as one or more instructions or code lines on the computer readable medium.

The specific implementations mentioned above further describe the object, technical solutions and beneficial effects of the present specification. It should be understood that the previous descriptions are merely specific implementations of the present specification and are not intended to limit the protection scope of the present specification. Any modification, equivalent replacement and improvement made based on the technical solution of the present specification shall fall within the protection scope of the present specification.

What is claimed is:

1. A computer-implemented method for processing sequential interaction data, comprising:
    obtaining a dynamic interaction graph constructed based on a dynamic interaction sequence, wherein:
        the dynamic interaction sequence comprises a plurality of interaction feature groups corresponding to a plurality of interaction events arranged in chronological order;
        each interaction feature group comprises a first object, a second object, and an interaction time of an interaction event that involved the first object and the second object;
        the dynamic interaction graph comprises a plurality of nodes including, for each interaction feature group, a first node that represents the first object of the interaction feature group and a second node that represents the second object of the interaction feature group; and
        for at least a portion of the plurality of nodes, the first node or second node is connected, by edges, to two leaf nodes that represent two objects in a previous interaction feature group corresponding to a previous interaction event in which an interaction object corresponding to the first node or the second node was involved;
    determining, in the dynamic interaction graph, a current sequence corresponding to a current node to be analyzed, wherein the current sequence comprises one or more nodes within a predetermined range reachable from the current node through edges and positional encoding of each of the one or more nodes relative to the current node in the dynamic interaction graph; and
    inputting the current sequence into a Transformer-based neural network model, wherein the neural network model comprises an embedding layer one or more attention layers;
    obtaining, at the embedding layer, N embedded vectors based on, for each of the one or more nodes, node features comprising attribute features of an object represented by the node and the positional encoding of the node;
    combining, at each attention layer, input vectors based on a degree of correlation between N input vectors obtained from a preceding layer to generate N output vectors, wherein the N input vectors to a first attention layer of the one or more attention layers comprises the N embedded vectors, wherein combining the input vectors based on the degree of correlation between the N input vectors obtained from the preceding layer to obtain the N output vectors comprises:
        using a first transformation matrix Q, a second transformation matrix K, and a third transformation matrix V to transform each of the N input vectors to obtain a first intermediate vector, a second intermediate vector, and a third intermediate vector corresponding to each of the N input vectors;
        for any $i^{th}$ input vector in the N input vectors, determining a degree of correlation between the $i^{th}$ input vector and each input vector based on a dot product operation performed on the first intermediate vector corresponding to the $i^{th}$ input vector and each second intermediate vector corresponding to each input vector;

performing a weighted combination on the third intermediate vector corresponding to each input vector using the degree of correlation between the $i^{th}$ input vector and each input vector as a weighting factor to obtain an $i^{th}$ combination vector corresponding to the $i^{th}$ input vector; and obtaining the N output vectors based on each combination vector corresponding to each input vector; and determining, by the neural network model, a feature vector corresponding to the current node based on the N output vectors generated by the one or more attention layers.

2. The computer-implemented method of claim 1, wherein obtaining the dynamic interaction graph constructed based on the dynamic interaction sequence comprises:

obtaining an existing dynamic interaction graph constructed based on an existing interaction sequence;

obtaining a new interaction feature group corresponding to a new interaction event;

adding two new nodes to the existing dynamic interaction graph, wherein a first new node of the two new nodes represents a new first object of the new interaction feature group and a second new node of the two new nodes represents a new second object of the new interaction feature; and for each new node that has a corresponding leaf node, adding an edge from the new node to the corresponding leaf node.

3. The computer-implemented method of claim 1, wherein obtaining the dynamic interaction graph constructed based on the dynamic interaction sequence comprises:

obtaining an existing dynamic interaction graph constructed based on an existing interaction sequence;

obtaining a new interaction sequence, wherein the new interaction sequence comprises a plurality of new interaction feature groups corresponding to a plurality of new interaction events;

for each new interaction feature group, adding two new nodes to the existing dynamic interaction graph, wherein a first new node of the two new nodes represents a new first object of the new interaction feature group and a second new node of the two new nodes represents a new second object of the new interaction feature group; and for each new node that has a corresponding leaf node, adding an edge from the new node to the corresponding leaf node.

4. The computer-implemented method of claim 1, wherein the current node is a node that has no edge in the dynamic interaction graph.

5. The computer-implemented method of claim 1, wherein the one or more nodes within the predetermined range comprise:

any node within a predetermined quantity K of edges; and/or any node whose interaction time is within a specified range of the interaction time of the interaction feature group corresponding to the current node.

6. The computer-implemented method of claim 1, wherein:

the first object of each interaction feature group is an object of a first classification and the second object of each interaction feature group is an object of a second classification;

for each node in the portion of the plurality of nodes:
the two leaf nodes to which the node is connected comprise a left node and a right node;
the left node corresponds to the first object of the first classification in the previous interaction event; and
the right node corresponds to the second object of the second classification in the previous interaction event.

7. The computer-implemented method of claim 6, wherein the positional encoding for each of the one or more nodes comprises (i) a quantity of edges between the node and the current node and (ii) whether the node is the left node or the right node.

8. The computer-implemented method of claim 1, wherein:

each interaction feature group further comprises a behavior feature of the interaction event of the interactive feature group; and the node features and the positional encoding of each of the one or more nodes comprise behavior features of an interaction feature group corresponding to the node.

9. The computer-implemented method of claim 1, wherein obtaining the N embedded vectors comprises:

embedding the node features of each of the one or more nodes to obtain N node embedded vectors;

embedding the positional encoding of each of the one or more nodes to obtain N position embedded vectors; and synchronizing the N node embedded vectors and the N position embedded vectors to obtain the N embedded vectors.

10. The computer-implemented method of claim 1, wherein:

each attention layer maintains m sets of transform matrices;

each set of transform matrices comprises the first transform matrix Q, the second transform matrix K, and the third matrix V, to obtain m vector sequences, wherein each vector sequence comprises N combination vectors obtained based on a set of transform matrices; and obtaining N output vectors based on each combination vector corresponding to each input vector comprises:
concatenating the m vector sequences to obtain a concatenated matrix;
transforming the concatenated matrix using a fourth transformation matrix; and
splitting the transformed concatenated matrix into N vectors as the N output vectors.

11. The computer-implemented method of claim 1, wherein:

the one or more attention layer comprises a plurality of attention layers comprising a first attention layer connected to the embedding layer and one or more subsequent attention layers;

the first attention layer obtains, as the N input vectors obtained from the preceding layer, the N embedded vectors from the embedding layer; and each subsequent attention layer obtains, as the N input vectors obtained from the preceding layer, the N output vectors generated by a preceding attention layer that precedes the subsequent attention layer.

12. The computer-implemented method of claim 11, wherein the neural network model combines the N output vectors obtained by each of the plurality of attention layers to obtain the feature vector corresponding to the current node.

13. The computer-implemented method of claim 11, wherein the neural network model combines the N output vectors obtained by a final attention layer in the plurality of attention layers to obtain the feature vector of the current node.

14. The computer-implemented method of claim 1, wherein the neural network model is trained by:
obtaining a historical feature group corresponding to a historical interaction event, wherein the historical feature group comprises a first sample object and a second sample object;
determining, in the dynamic interaction graph, a first sequence corresponding to the first sample object and a second sequence corresponding to the second sample object;
respectively inputting the first sequence and the second sequence into the neural network model to obtain a first feature vector corresponding to the first sample object and a second feature vector corresponding to the second sample object;
predicting, based on the first feature vector and the second feature vector, whether the first sample object and the second sample object interact, to obtain a prediction result;
determining a predicted loss based on the prediction result; and
updating the neural network model based on the predicted loss.

15. The computer-implemented method of claim 1, wherein the neural network model is trained by:
selecting a sample object from the dynamic interaction sequence and obtaining a classification label of the sample object;
determining, in the dynamic interaction graph, a sample sequence corresponding to the sample object;
inputting the sample sequence into the neural network model to obtain a feature vector of the sample object;
predicting a classification of the sample object based on the feature vector of the sample object to obtain a prediction result;
determining a predicted loss based on the prediction result and the classification label; and
updating the neural network model based on the predicted loss.

16. A non-transitory, computer-readable medium storing one or more instructions executable by a computer system to perform operations comprising:
obtaining a dynamic interaction graph constructed based on a dynamic interaction sequence, wherein:
the dynamic interaction sequence comprises a plurality of interaction feature groups corresponding to a plurality of interaction events arranged in chronological order;
each interaction feature group comprises a first object, a second object, and an interaction time of an interaction event that involved the first object and the second object;
the dynamic interaction graph comprises a plurality of nodes including, for each interaction feature group, a first node that represents the first object of the interaction feature group and a second node that represents the second object of the interaction feature group; and for at least a portion of the plurality of nodes, the first node or second node is connected, by edges, to two leaf nodes that represent two objects in a previous interaction feature group corresponding to a previous interaction event in which an interaction object corresponding to the first node or the second node was involved;
determining, in the dynamic interaction graph, a current sequence corresponding to a current node to be analyzed, wherein the current sequence comprises one or more nodes within a predetermined range reachable from the current node through edges and positional encoding of each of the one or more nodes relative to the current node in the dynamic interaction graph; and
inputting the current sequence into a Transformer-based neural network model, wherein the neural network model comprises an embedding layer one or more attention layers;
obtaining, at the embedding layer, N embedded vectors based on, for each of the one or more nodes, node features comprising attribute features of an object represented by the node and the positional encoding of the node;
combining, at each attention layer, input vectors based on a degree of correlation between N input vectors obtained from a preceding layer to generate N output vectors, wherein the N input vectors to a first attention layer of the one or more attention layers comprises the N embedded vectors, wherein combining the input vectors based on the degree of correlation between the N input vectors obtained from the preceding layer to obtain the N output vectors comprises:
using a first transformation matrix Q, a second transformation matrix K, and a third transformation matrix V to transform each of the N input vectors to obtain a first intermediate vector, a second intermediate vector, and a third intermediate vector corresponding to each of the N input vectors;
for any $i^{th}$ input vector in the N input vectors, determining a degree of correlation between the $i^{th}$ input vector and each input vector based on a dot product operation performed on the first intermediate vector corresponding to the $i^{th}$ input vector and each second intermediate vector corresponding to each input vector;
performing a weighted combination on the third intermediate vector corresponding to each input using the degree of correlation between the $i^{th}$ input vector and each input vector as a weighting factor to obtain an $i^{th}$ combination vector corresponding to the $i^{th}$ input vector; and
obtaining the N output vectors based on each combination vector corresponding to each input vector; and
determining, by the neural network model, a feature vector corresponding to the current node based on the N output vectors generated by the one or more attention layers.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a dynamic interaction graph constructed based on a dynamic interaction sequence, wherein:

the dynamic interaction sequence comprises a plurality of interaction feature groups corresponding to a plurality of interaction events arranged in chronological order;

each interaction feature group comprises a first object, a second object, and an interaction time of an interaction event that involved the first object and the second object;

the dynamic interaction graph comprises a plurality of nodes including, for each interaction feature group, a first node that represents the first object of the interaction feature group and a second node that represents the second object of the interaction feature group; and for at least a portion of the plurality of nodes, the first node or second node is connected, by edges, to two leaf nodes that represent two objects in a previous interaction feature group corresponding to a previous interaction event in which an interaction object corresponding to the first node or the second node was involved;

determining, in the dynamic interaction graph, a current sequence corresponding to a current node to be analyzed, wherein the current sequence comprises one or more nodes within a predetermined range reachable from the current node through edges and positional encoding of each of the one or more nodes relative to the current node in the dynamic interaction graph; and inputting the current sequence into a Transformer-based neural network model, wherein the neural network model comprises an embedding layer one or more attention layers;

obtaining, at the embedding layer, N embedded vectors based on, for each of the one or more nodes, node features comprising attribute features of an object represented by the node and the positional encoding of the node;

combining, at each attention layer, input vectors based on a degree of correlation between N input vectors obtained from a preceding layer to generate N output vectors, wherein the N input vectors to a first attention layer of the one or more attention layers comprises the N embedded vectors, wherein combining the input vectors based on the degree of correlation between the N input vectors obtained from the preceding layer to obtain the N output vectors comprises:

using a first transformation matrix Q, a second transformation matrix K, and a third transformation matrix V to transform each of the N input vectors to obtain a first intermediate vector, a second intermediate vector, and a third intermediate vector corresponding to each of the N input vectors;

for any $i^{th}$ input vector in the N input vectors, determining a degree of correlation between the $i^{th}$ input vector and each input vector based on a dot product operation performed on the first intermediate vector corresponding to the $i^{th}$ input vector and each second intermediate vector corresponding to each input vector;

performing a weighted combination on the third intermediate vector corresponding to each input using the degree of correlation between the $i^{th}$ input vector and each input vector as a weighting factor to obtain an $i^{th}$ combination vector corresponding to the $i^{th}$ input vector; and obtaining the N output vectors based on each combination vector corresponding to each input vector; and determining, by the neural network model, a feature vector corresponding to the current node based on the N output vectors generated by the one or more attention layers.

18. The computer-implemented system of claim 17, wherein obtaining the dynamic interaction graph constructed based on the dynamic interaction sequence comprises:

obtaining an existing dynamic interaction graph constructed based on an existing interaction sequence;

obtaining a new interaction feature group corresponding to a new interaction event;

adding two new nodes to the existing dynamic interaction graph, wherein a first new node of the two new nodes represents a new first object of the new interaction feature group and a second new node of the two new nodes represents a new second object of the new interaction feature; and for each new node that has a corresponding leaf node, adding an edge from the new node to the corresponding leaf node.

19. The computer-implemented system of claim 17, wherein obtaining the dynamic interaction graph constructed based on the dynamic interaction sequence comprises:

obtaining an existing dynamic interaction graph constructed based on an existing interaction sequence;

obtaining a new interaction sequence, wherein the new interaction sequence comprises a plurality of new interaction feature groups corresponding to a plurality of new interaction events;

for each new interaction feature group, adding two new nodes to the existing dynamic interaction graph, wherein a first new node of the two new nodes represents a new first object of the new interaction feature group and a second new node of the two new nodes represents a new second object of the new interaction feature group; and for each new node that has a corresponding leaf node, adding an edge from the new node to the corresponding leaf node.

* * * * *

UNITED STATES PATENT AND TRADEMARK OFFICE
CERTIFICATE OF CORRECTION

PATENT NO. : 11,636,341 B2
APPLICATION NO. : 17/188112
DATED : April 25, 2023
INVENTOR(S) : Xiaofu Chang, Jianfeng Wen and Le Song It is certified that error appears in the above-identified patent and that said Letters Patent is hereby corrected as shown below:

In the Claims

In Claim 1, Column 20, Line 42, after "layer" insert -- and --, therefor.

In Claim 10, Column 22, Line 42, after "third" insert -- transform --, therefor.

In Claim 16, Column 24, Line 17, after "layer" insert -- and --, therefor.

In Claim 16, Column 24, Line 47, after "input" insert -- vector --, therefor.

In Claim 17, Column 25, Line 32, after "layer" insert -- and --, therefor.

In Claim 17, Column 26, Line 7, after "input" insert -- vector --, therefor.

Signed and Sealed this
Thirteenth Day of June, 2023

Katherine Kelly Vidal
*Director of the United States Patent and Trademark Office*